United States Patent [19]

Dalet

[11] 4,314,509
[45] Feb. 9, 1982

[54] PYROTECHNIC CHARGE, WITH A SHORT COMBUSTION TIME, COMPRISING INCLINED PLATES OF PROPELLANT AND DEFLECTORS, AND A PROPULSION SYSTEM USING A CHARGE OF THIS TYPE

[75] Inventor: Francis A. Dalet, Tresses, France

[73] Assignee: Societe Nationale des Poudres et Explosifs, France

[21] Appl. No.: 105,562

[22] Filed: Dec. 20, 1979

[30] Foreign Application Priority Data

Dec. 28, 1978 [FR] France ............................. 78 36724

[51] Int. Cl.³ .............................................. C06D 5/00
[52] U.S. Cl. .................................. 102/288; 102/289; 60/255
[58] Field of Search ............................... 102/99–102, 102/288, 289; 60/39.47, 247, 253, 255

[56] References Cited

U.S. PATENT DOCUMENTS

| | | | |
|---|---|---|---|
| 3,048,112 | 8/1962 | Shope | 60/39.47 |
| 3,128,600 | 4/1964 | Oldham | 60/39.47 X |
| 3,217,651 | 11/1965 | Braun et al. | 102/101 |
| 3,218,798 | 11/1965 | MacPherson | 60/39.47 X |
| 3,278,356 | 10/1966 | Katz | 102/102 X |
| 3,362,158 | 1/1968 | Thurston et al. | 60/39.47 X |
| 3,722,421 | 3/1973 | Thrailkill et al. | 102/101 |
| 3,811,380 | 5/1974 | Glass | 102/101 X |

Primary Examiner—Peter A. Nelson
Attorney, Agent, or Firm—Bucknam and Archer

[57] ABSTRACT

Pyrotechnic charge, with a short combustion time, comprising inclined plates of propellant and deflectors, and a propulsion system using a charge of this type.

The pyrotechnic charge is intended especially for use in a propulsion system for acceleration, and it comprises a set of plates of solid propellant, which plates are arranged approximately parallel to one another and provide at least one longitudinal channel for discharging the combustion gases in the direction of the nozzle of the propulsion system. In order to achieve a very high flow rate of gas without causing breakage of the plates of propellant, the plates of propellant (6) are inclined towards the longitudinal channel, and the charge comprises deflectors (5) which are arranged approximately parallel to the plates of propellant and which possess, in a longitudinal cross-section of the charge, a length which is equal to or greater than the length of the plates of propellant.

6 Claims, 2 Drawing Figures

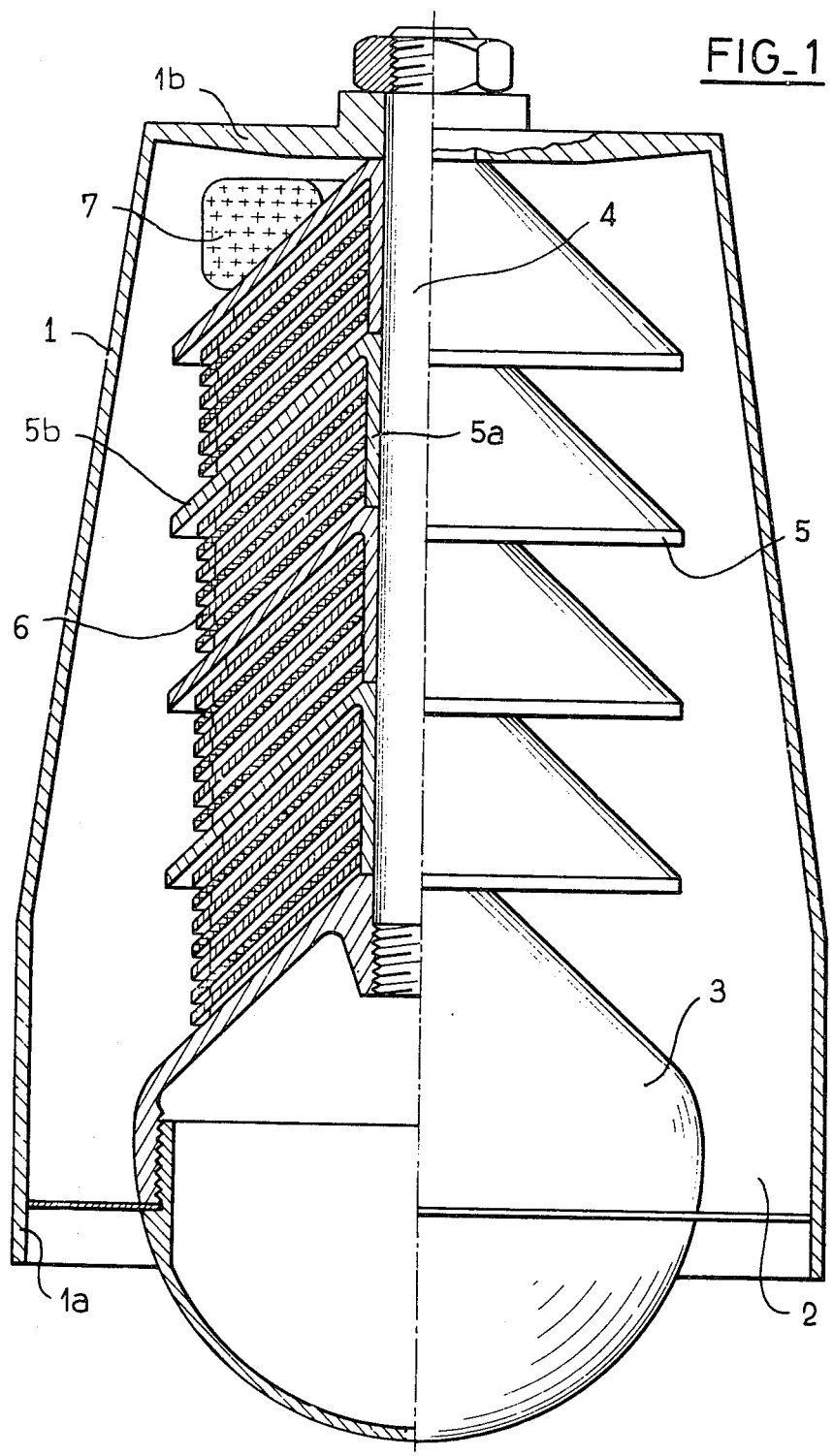
U.S. Patent  Feb. 9, 1982  Sheet 1 of 2  4,314,509
FIG_1

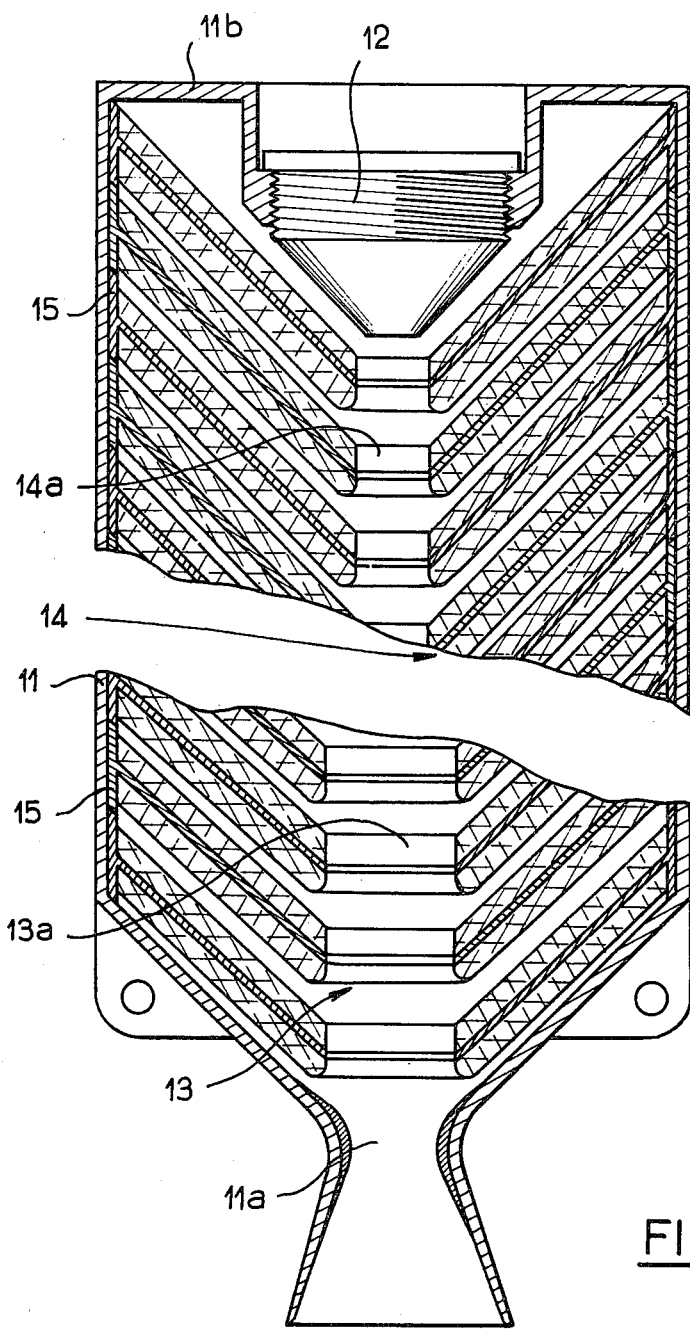
FIG_2

PYROTECHNIC CHARGE, WITH A SHORT COMBUSTION TIME, COMPRISING INCLINED PLATES OF PROPELLANT AND DEFLECTORS, AND A PROPULSION SYSTEM USING A CHARGE OF THIS TYPE

The invention essentially relates to a pyrotechnic charge, with a short combustion time, which is intended especially for use in a propulsion system for accelerating a self-propelled device such as a missile or a rocket, this charge comprising a set of plates of solid propellant, which plates are arranged approximately parallel to one another and provide at least one channel for discharging the combustion gases in the direction of the nozzle of the propulsion system, and the invention relates, as a secondary consideration, on the one hand to a propulsion system for a self-propelled device, using a pyrotechnic charge of this type, and on the other hand to a particular plate of propellant which makes it possible to produce this charge.

Pyrotechnic charges comprising a stack of plates of propellant are known, and, for example, French Pat. No. 2,359,981 describes a pyrotechnic charge which consists of plane rings of propellant which are arranged around a central support tube and through which rods pass, which rods extend parallel to the support tube, and of separating rings serving as spacers for the rings of propellant. The longitudinal channel for discharging the combustion gases is located at the periphery of this charge and possesses a cross-section which increases from the upstream side, located near the front plate of the propulsion system, to the downstream side, located near the annular thrust nozzle, this increasing cross-section being achieved by gradually reducing the external diameter of the rings, from the upstream side to the downstream side, and by correlatively reducing the size of the multi-perforated casing of the combustion chamber, which casing is located inside a launching tube. Pyrotechnic charges of this type, which possess plane plates arranged along the transverse planes of the propulsion system, cause disturbances in the flow of the combustion gases because the flow of these gases is initially radial between the plates of propellant and then becomes longitudinal in the flow channel; these disturbances lower the propulsive efficiency of the pyrotechnic charge and require additional arrangements, such as the reinforcement of the launching tube and the use of a multi-perforated casing.

A second example of pyrotechnic charges comprising a stack of plates of propellant is described in U.S. Pat. No. 3,048,112. According to this patent, when considering a longitudinal cross-section of the charge, the plates of propellant are inclined towards the central longitudinal channel for discharging the combustion gases in the direction of the nozzle of the propulsion system, but these plates, which have the general shape of a truncated cone, are provided with a large number of notches or perforations, which lower their mechanical strength, especially at the end of combustion, and disturb the flow of the combustion gases throughout combustion; however, these slots are necessary in order to equilibrate the local pressures on either side of one and the same plate, in order to prevent these plates from breaking.

The object of the present invention is to restrict the disturbances in the flow of the combustion gases whilst at the same time avoiding the breakage of plates of propellant, and this object is achieved by combining, on the one hand, plates of propellant which are inclined towards the longitudinal channel, and, on the other hand, deflectors which are arranged approximately parallel to the plates of propellant and which possess, in a longitudinal cross-section of the charge, a length which is equal to or greater than the length of the plates of propellant, this making it possible, firstly, to direct the combustion gases towards the nozzle of the propulsion system, and, secondly, to protect the free end of these plates of propellant by virtue of the fact that, during combustion, those ends of these deflectors which are located near the longitudinal discharge channel extend beyond the corresponding ends of the plates of propellant.

More particularly, the plates of propellant are geometric bodies of revolution because the propulsion systems generally have a cylindrical shape, it being possible, in particular, for these plates of propellant to be geometric bodies possessing a conical envelope, and, according to the invention, these geometric bodies are provided with ribs which are arranged approximately along generatrices. However, when the invention is utilised for the production of particular pyrotechnic charges, such as the charges used in gas generators having a very short operating time, the plates of propellant can be plane and inclined.

In the case of short charges, all the plates of propellant advantageously have an identical shape; in the case of long charges, the plates of propellant are advantageously arranged in series, all the plates of one and the same series having an identical shape. When several plates of propellant are in mutual contact, they are advantageously provided with ribs which determine their separation, and these ribs are arranged approximately parallel to the gas flow which is formed between these plates.

The deflectors can be separate members from the plates of propellant and can be intercalated between these plates of propellant, but they can also be integral either with all the plates of propellant or with some of these plates. Since the deflectors must also withstand the flow of the combustion gases, they are advantageously rendered integral with the mechanical structure of the pyrotechnic charge and can advantageously bear on one another.

According to one modified embodiment, the longitudinal channel for discharging the gases is located at the periphery of the charge which is intended for use in a propulsion system with an annular nozzle, but according to another modified embodiment, the longitudinal channel is inside the charge which, in this case, is intended for use in a propulsion system with a central nozzle.

The advantages gained by virtue of this invention essentially consist of the fact that the gas flows which are formed between the plates of propellant are not directed transversely relative to the direction of ejection of these gases through the nozzle of the propulsion system equipped with this charge, but, on the contrary, are directed obliquely towards this nozzle, and this considerably restricts the disturbances in the gas flow. Protection of that end of the plates of propellant which is located near the longitudinal channel for discharging the combustion gases is provided by the deflectors, the function of which is to direct and position the various gas flows and which preferably do not act as nozzle elements, this protection making it possible to prevent any inopportune breakage of the plates of propellants, which could also disturb the gas flow and lower the propulsive efficiency of the charge.

In the following text, the invention is explained in greater detail with the aid of two drawings showing two particular embodiments.

BRIEF DESCRIPTION OF THE DRAWINGS

FIG. 1 shows a propulsion system for acceleration, with an annular nozzle, and corresponds, in its left-hand part, to a longitudinal half-section of the complete propulsion system, and, in its right-hand part, to a half-section of the casing, the pyrotechnic elements having been removed.

FIG. 2 shows a partial longitudinal section of a propulsion system with a central nozzle.

DETAILED DESCRIPTION OF THE INVENTION

According to FIG. 1, the propulsive pyrotechnic charge according to the invention is located in a propulsion system for acceleration, the casing 1 of which is partially in the shape of a truncated cone, and the downstream cylindrical part 1a of this casing constituting the external element of the annular nozzle 2 which is bounded on the inside by the central bulb 3 which is integral with the upstream plate 1b of the casing via the central rod 4. This rod makes it possible to centre the deflectors 5 which consist of a cylindrical centring part 5a, serving as a spacer, and of a conical active part 5b, on which the stack of rings of propellant 6 rests; each of these rings of propellant possesses a conical envelope and is formed of a perforated plate which is given the shape of a truncated cone and which possesses ribs determining the spacing between the plates of propellant, these ribs being arranged along generatrices inside and outside the truncated cone. The space available between the upstream plate 1b and the upstream deflector can advantageously be used for positioning the annular igniter 7 for the charge, the firing leads of which igniter are not shown.

According to a first modified embodiment which can be constructed from the example described with reference to FIG. 1, it is possible to use a central igniter located in a hollow rod possessing lateral firing orifices, but, in this case, the size of the deflectors is advantageously reduced at their conical active surfaces 5b which are peripherally engaged in wedging notches provided on three bearing plates integral with the casing, these plates being arranged in three axial longitudinal planes 120 degrees apart. According to a second modified embodiment which can be constructed from the example described with reference to FIG. 1, the size of the casing can be reduced at the upstream plate 1b, the external diameter of which must then be brought to approximately the same diameter as the internal diameter of the cylindrical part 1a, so as to achieve the same thermodynamic conditions of combustion, it then being necessary for such a propulsion system for acceleration to be fired from a cylindrical launching tube, the internal diameter of which is equal to the internal diameter of the cylindrical part 1a, and which is pressure-resistant, because the annular nozzle will then be determined by the passage existing between the central bulb 3 and the internal surface of this launching tube.

According to FIG. 2, the propulsive pyrotechnic charge according to the invention is located in a cylindrical propulsion system 11 which comprises a central nozzle 11a in the downstream zone, and the upstream plate 11b of which is suitable for receiving a central igniter 12. The charge itself is formed of a stack of conical rings comprising a metal frame and two layers of propellant located on either side of this frame. Three different types of rings are used:

the conical rings 13 located in the downstream zone are produced from a propellant with a fast combustion rate and possess a central orifice 13a, the cross-section of which is equal to twice the cross-section of the central nozzle, the conical rings (not shown) located in the middle zone are produced from a propellant with a moderate combustion rate and possess a central orifice, the cross-section of which is equal to one and a half times the cross-section of the central nozzle, and the conical rings 14 located in the upstream zone are produced from the same propellant as that used for the production of the conical rings in the middle zone, and possess a central orifice 14a, the cross-section of which is slightly less than the cross-section of the central nozzle.

All the conical rings bear on one another by means of the external shells 15 of the metal frames, the diameter of the central bore of these frames being equal to the diameter of the central orifice of the conical ring. This metal frame can thus act as a deflector as soon as combustion has started, which combustion will gradually uncover the edge of the central bore as the central perforation in the plates of propellant increases.

I claim:

1. Pyrotechnic charge which comprises a set of plates of solid propellant, which plates are arranged approximately parallel to one another and provide at least one longitudinal channel for discharging the combustion gases in the direction of the nozzle of the propulsion system, these plates of propellant being inclined towards this longitudinal channel, deflectors which are arranged approximately parallel to the plates of propellant and which possess, in a longitudinal cross-section of the charge, a length which is greater than the length of the plates of propellant, said deflectors being separate members from the plates of propellant and being intercalated between the plates of propellant, the longitudinal channel for discharging the gases being located at the periphery of said charge.

2. Pyrotechnic charge according to claim 1, wherein the plates of propellant are geometric bodies of revolution provided with ribs which are arranged approximately along generatrices.

3. Pyrotechnic charge according to one of claim 1 wherein the deflectors bear on one another.

4. Propulsion system for a self-propelled device provided with a pyrotechnic charge, wherein the nozzle is annular and the pyrotechnic charge is in accordance with claim 1.

5. Plate of propellant, for a pyrotechnic charge, wherein the charge conforms to claim 2.

6. The pyrotechnic charge according to claim 2 wherein all the plates of propellant have the identical shape.

* * * * *